(12) United States Patent
Allen (10) Patent No.: US 11,199,674 B2
(45) Date of Patent: Dec. 14, 2021

(54) FIBER OPTIC HOLDER TRAY ADAPTER; ASSEMBLY; AND METHOD

(71) Applicant: CommScope Technologies LLC, Hickory, NC (US)

(72) Inventor: Barry Wayne Allen, Siler City, NC (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/887,876

(22) Filed: May 29, 2020

(65) Prior Publication Data

US 2021/0018710 A1   Jan. 21, 2021

Related U.S. Application Data

(60) Provisional application No. 62/853,896, filed on May 29, 2019.

(51) Int. Cl.
  *G02B 6/44* (2006.01)
(52) U.S. Cl.
  CPC ................... *G02B 6/4453* (2013.01)
(58) Field of Classification Search
  CPC .. G02B 6/4453; G02B 6/3897; G02B 6/4446; G02B 6/4454; G02B 6/4471
  See application file for complete search history.

(56) References Cited

U.S. PATENT DOCUMENTS

| | | | | |
|---|---|---|---|---|
| 6,304,707 B1* | 10/2001 | Daems | ............... | G02B 6/4442 385/135 |
| 7,310,471 B2* | 12/2007 | Bayazit | ............... | G02B 6/4471 385/134 |
| 8,135,257 B2* | 3/2012 | Cooke | ............... | G02B 6/4471 385/135 |
| 8,285,104 B2* | 10/2012 | Davis | ............... | G02B 6/4471 385/135 |
| 8,538,227 B2* | 9/2013 | Cowen | ............... | G02B 6/4471 385/135 |
| 8,687,934 B2* | 4/2014 | Wright | ............... | G02B 6/4454 385/135 |
| 9,042,702 B2* | 5/2015 | Rodriguez | ............... | G02B 6/36 385/136 |

(Continued)

OTHER PUBLICATIONS

Extended European Search Report for Application No. 20176677.1 dated Oct. 1, 2020.

*Primary Examiner* — Ryan A Lepisto
(74) *Attorney, Agent, or Firm* — Merchant & Gould P.C.

(57) ABSTRACT

A telecommunications assembly includes an adapter unit, a tray, and a telecommunications component. The adapter unit can be formed with a main body defining a first attachment feature disposed on a bottom side of the main body and a second attachment feature disposed on a top side of the main body. The tray can define a base wall and a side wall extending from the base wall, the tray defining a third attachment feature removably interconnected with the first attachment feature. The telecommunications component can define a fourth attachment feature removably interconnected with the second attachment feature such that the telecommunications component is attached to the tray by the adapter unit, the fourth attachment feature being incompatible for attachment with the third attachment feature.

20 Claims, 8 Drawing Sheets

(56) References Cited

U.S. PATENT DOCUMENTS

| | | | |
|---|---|---|---|
| 9,778,433 B2 * | 10/2017 | Kostecka | G02B 6/4454 |
| 2012/0134639 A1 * | 5/2012 | Giraud | G02B 6/4454 |
| | | | 385/135 |
| 2013/0105420 A1 * | 5/2013 | Ray | G02B 6/4454 |
| | | | 211/13.1 |
| 2015/0234142 A1 | 8/2015 | Courchaine et al. | |

* cited by examiner

PRIOR ART

FIG. 14

PRIOR ART

FIBER OPTIC HOLDER TRAY ADAPTER; ASSEMBLY; AND METHOD

RELATED APPLICATIONS

This application claims priority to U.S. Provisional Patent Application Ser. No. 62/853,896, filed on May 29, 2019, the entirety of which is incorporated by reference herein.

TECHNICAL FIELD

The present disclosure relates generally to fiber optic telecommunications components. More particularly, the present disclosure relates to systems for interconnecting telecommunications components.

BACKGROUND

Telecommunications systems, for example fiber optic enclosures, can involve sub-components that are connected together to form an overall assembly. In some examples, the sub-components are configured with connection features that are compatible with corresponding connection features of other sub-components. In some examples, the sub-components of one model or type of system have connection features that are not compatible with those of sub-components of another model or type of system. As such, in some cases, assemblies are limited to those involving compatible connection features. Improvements are desired.

SUMMARY

This disclosure pertains to fiber optic splice tray systems used by telecommunication closures of the type found in the outside plant. For example, some tray systems utilize fusion holder modules to organize and protect spliced optical fibers stored on the trays. These modules have also been integrated with optical components such as WDM and splitters to enable standardized fixation to the trays. In one example, the CommScope FOSC line of splice trays are configured to receive and retain a now-common splice holder module branded as the SM6 module. The trays and modules are provided with compatible attachment features that allow for the modules to be mounted to the trays. Due to the extremely long product life cycle of some telecommunications equipment, for example a life cycle of 15 years or more, these features have become de facto industry standards for some users. However, with progress and design developments, a need for change in attachment systems may exist, thereby presenting an issue for these existing attachment features which are not necessarily compatible with newer and/or other systems. In some applications, it is desired to mount modules having such attachment features to trays having a different type of attachment feature. Through the use of a new adapter unit, such modules can be installed identically to how they have been in the past into trays having non-compatible attachment features. This approach enables the ability to have backward compatibility while enabling for new attachment designs to be integrated into trays that may provide for enhanced performance. In one aspect, the adapter unit snaps into trays and can be repositioned as needed. This methodology allows installers to rehab older closures being upgrading to a new tray design without requiring the removal of the fibers from the module, for example a splice holder. In one aspect, the present disclosure relates to a one-piece fiber optic adapter holder that can be used to retain a fiber optical adapter without adding to an overall height of the fiber optical adapter.

In one example, a telecommunications assembly includes an adapter unit, a tray, and a telecommunications component. The adapter unit can be formed with a main body defining a first attachment feature disposed on a bottom side of the main body and a second attachment feature disposed on a top side of the main body. The tray can define a base wall and a side wall extending from the base wall, the tray defining a third attachment feature removably interconnected with the first attachment feature. The telecommunications component can define a fourth attachment feature removably interconnected with the second attachment feature such that the telecommunications component is attached to the tray by the adapter unit, the fourth attachment feature being incompatible for attachment with the third attachment feature.

In one example, an adapter unit for interconnecting a telecommunications component with a telecommunications tray, the adapter unit includes a main body defining a bottom side and a top side, a first attachment feature disposed on the bottom side, the first attachment feature being configured for attachment to a corresponding attachment feature of the telecommunications tray, and a second attachment feature disposed on the top side, the second attachment feature being configured for attachment to a corresponding attachment feature of the telecommunications component, the second attachment feature being incompatible for attachment with the first attachment feature.

In an example, the first attachment feature includes a plurality of first attachment features.

In an example, wherein the second attachment feature includes a plurality of second attachment features.

In an example, the adapter unit is formed as a unitary component.

In an example, the adapter unit is symmetrical about a longitudinal axis.

In an example, the first attachment feature includes at least one interlock structure and at least one ramped structure.

In an example, the first attachment feature includes a plurality of interlock structures and a plurality of ramped structures.

In an example, the second attachment feature includes at least one pair of oppositely facing recesses disposed in oppositely facing sidewalls.

In an example, the second attachment feature includes a plurality of oppositely facing recesses disposed in oppositely facing sidewalls.

In an example, the adapter unit main body defines at least one aperture for enabling disconnection of the first and third attachment features.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the examples disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Referring to FIGS. 1 to 6, a telecommunications arrangement 10 is shown in various configurations. In one aspect, the telecommunications arrangement includes a tray 12 for storing telecommunications components and fiber optic cabling. As shown, the tray 12 includes a base wall 14 and a circumferential sidewall 16 to define an interior volume 18. To retain fiber optic cables within the tray 12, extension tabs or members 20 can be provided. In the example shown, a plurality of extension tabs 20 are provided extending from the sidewall 16 proximate a top edge and over the interior volume 18 in a direction parallel to the base wall 14.

Figure 1:
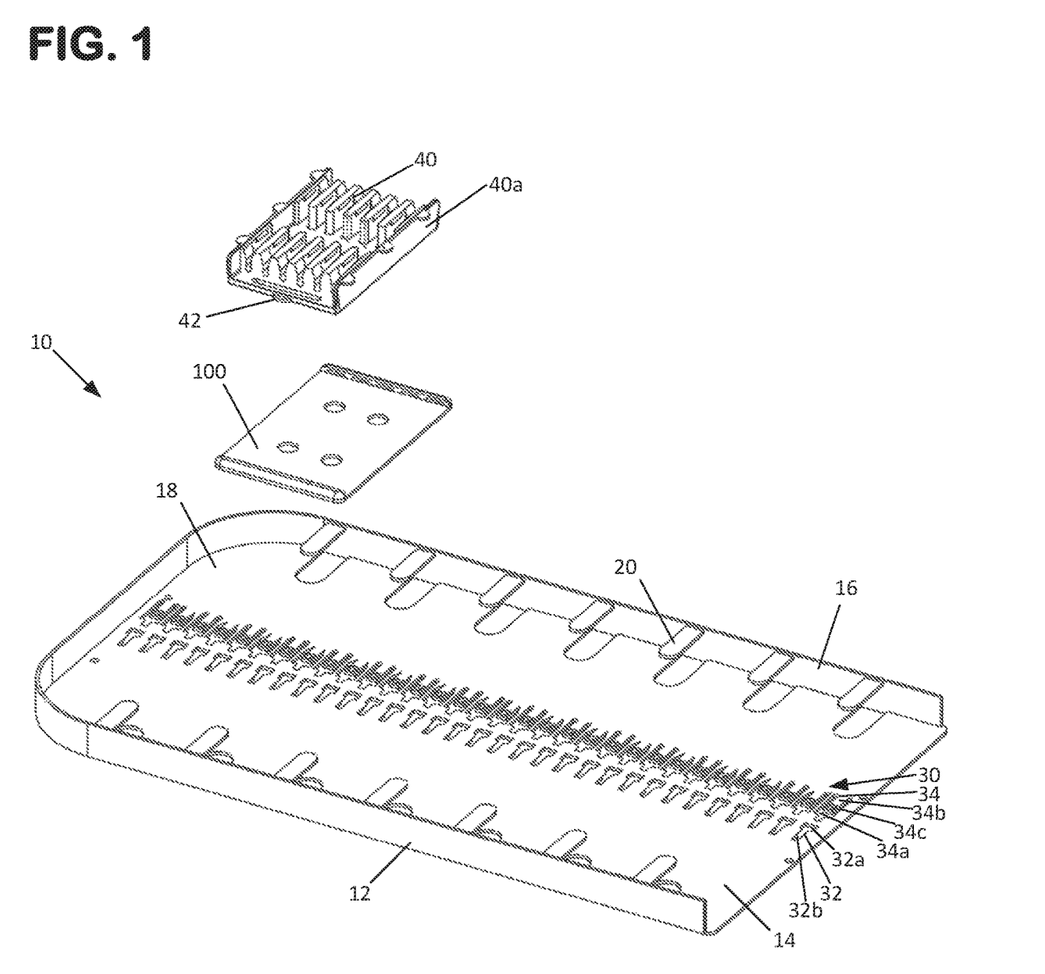
FIG. 1 is an exploded perspective view of telecommunications tray, and an adapter unit, and a telecommunications component.

The tray 12 is also shown as including a plurality of attachment arrangements 30 arranged in an array extending the length of the tray 12 along the base wall 14. The attachment arrangements 30 are configured to receive and retain various telecommunications components, such as fiber optic adapters, splice holders, optical splitters, wavelength division multiplexers (WDM), and the like that are provided with a attachment arrangement compatible with the attachment arrangements 30.

In one aspect, each attachment arrangement 30 includes a pair of connection points 32, 34. The first connection point 32 is configured as a t-shaped opening in the base wall 14 with a first open portion 32a and a second open portion 32b. The second connection point 34, arranged oppositely from the first connection point 32, is configured with a first opening 34a into which a cantilevered tab 34b extends such that open side slots 34c exist on each side of the cantilevered tab 34b. Similarly constructed attachment arrangements for use with interconnecting telecommunications components are shown and described in Patent Cooperation Treaty (PCT) Application Serial Number PCT/US2019/17904, filed on Feb. 13, 2019, the entirety of which is incorporated by reference herein; Patent Cooperation Treaty (PCT) Application Serial Number PCT/US2019/028245, filed on Apr. 19, 2019, the entirety of which is incorporated by reference herein; and U.S. Provisional Patent Application Ser. No. 62/824,824, filed on Mar. 27, 2019, the entirety of which is incorporated by reference herein.

Figure 13:
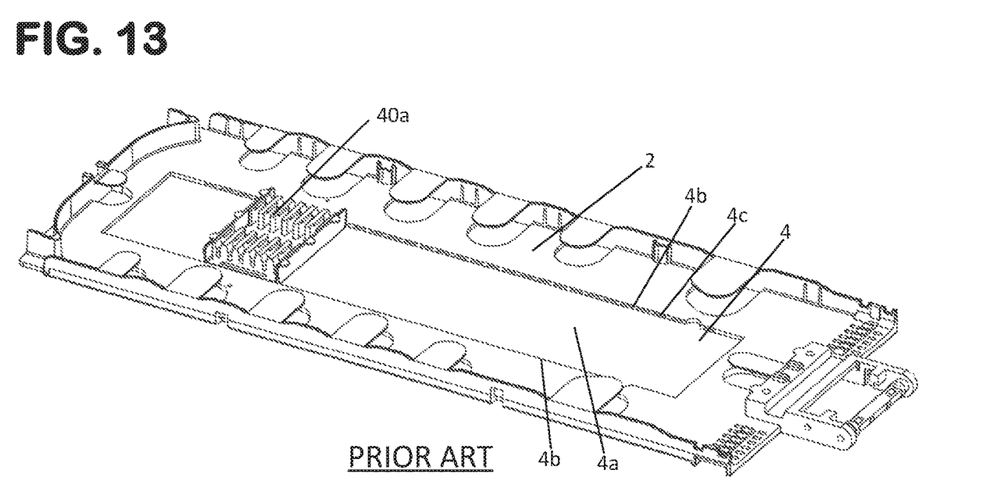
FIG. 13 shows a prior art tray with the first telecommunications component attached directly to the tray.
Figure 14:
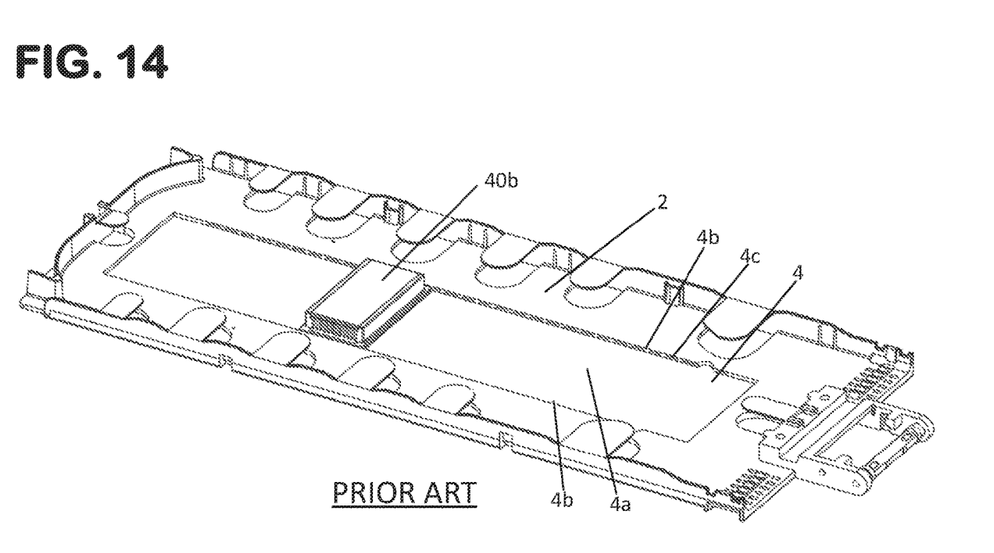
FIG. 14 shows a prior art tray with the second telecommunications component attached directly to the tray.

Although the tray 12 is provided first attachment arrangements 30, some telecommunications components 40 are configured with attachment arrangements 42 that are incompatible for connection with the first attachment arrangements 30. For example, the telecommunications components 40a, 40b shown at FIGS. 1-6 are provided with attachment arrangements 42, configured as oppositely extending side tabs, rather than features on the bottom that would enable connection to the first attachment arrangement 30. Accordingly, the telecommunications components 40 cannot be directly connected to the tray 12. Such a circumstance can be the case where the telecommunications components 40 are configured for direct attachment to differently configured attachment arrangements of another type of tray. For example, FIGS. 13 and 14 show a prior art tray 2 with a attachment arrangement 4 that consists of a recessed area 4a bounded by a pair of sidewalls 4b each containing an array of recesses 4c for receiving tabs 42 of the telecommunications components 40. Exemplary trays and telecommunications components with this connection type are manufactured by CommScope Inc, of Hickory, N.C., USA for use in CommScope FOSC fiber optic splice closures which can be, for example, gel-sealed and/or heat shrink tubing closures.

In order to enable variously configured telecommunications components 40 with attachment arrangements 42 that are different from or otherwise incompatible with the attachment arrangements 30 of the tray 12, a specially configured adapter unit 100 can be provided. The adapter unit 100 can be provided with one or more attachment arrangements 110 that are compatible with the attachment arrangements 30 of the tray 12 and with one or more attachment arrangements 120 that are compatible with the attachment arrangements 42 of the telecommunications components 40. With the use of the adapter unit 100, many types of telecommunications components can be connected to many types of telecommunications trays, thereby increasing flexibility among different systems and backwards compatibility with legacy-type systems when new attachment arrangements are developed.

With reference to FIGS. 7-12, the adapter unit 100 is configured as a main body 102 having a top side 102a and a bottom side 102b extending between side edges 102c, 102d and front and rear edges 102e, 102f. In one aspect, the attachment arrangement 120 is provided on the top side 102a of the main body 102.

In one aspect, the attachment arrangement 110 is configured with a pair of attachment features 112, each including a pair of oppositely arranged interlock structures 114 and a pair of ramp structures 116. Accordingly, the main body 102 can be attached to a pair of attachment arrangements 30 of the tray 12. In alternative arrangements, the attachment arrangement 110 can be configured with only one pair of interlock structures 114 and one pair of ramped structures 116 or with more than two pairs of the interlock structures 114 and more than two pairs of the ramped structure 116. For example, the attachment arrangement 110 can be provided with three, four, five, or more pairs of the interlock and ramped structures 114, 116. It is also noted that the pairs of interlock and ramped structures 114, 116 are symmetrically arranged such that the adapter unit is symmetrical about a longitudinal axis X. With such a configuration, the adapter unit 100 can be easily mounted to the tray 12 in multiple orientations.

As shown, each of the ramp structures 116 includes a ramped surface 116a and a stop surface 116b. As shown, each of the interlock structures 114 includes a pair of angled or sloped surfaces 114a that form a dovetail shape, thereby enabling the interlock structures 114 to form a tight connection against the tray 12. As configured, the attachment arrangement 110 can be connected to the attachment arrangement 30 by aligning the main body bottom side 102b with the base wall 14 such that the interlock structures 114 and ramp structures 116 drop into the openings 32a, 32b of the connection point 32 and the opening 34a of the connection point 34. From this position, the main body 102 can be displaced laterally in a direction towards the cantilevered tab 34b until the tab snaps over the ramped surface 116a and abuts the stop surface 116b. In this position, the attachment arrangements 110, 42 are fully interconnected. The U.S. 62/824,824, PCT/US2019/17904, and PCT/US2019/028245 applications describe a generally similar connection arrangement between two components. To detach the adapter unit 100 from the tray 12, the cantilevered tabs 34b can be disengaged by depressing them away from the main body 102 and tray 12 through access openings 102g provided through the main body 102. In the example shown, the main body 102 is shown with four access openings 102g such that two cantilevered tabs 34b can be disengaged from two ramped structures 116 from either side of the main body 102.

In one aspect, the attachment arrangement 120 is configured similarly to that shown in FIGS. 13 and 14 with a pair of oppositely facing sidewalls 122 extending along the side edges 102c, 102d and between the front and rear edges 102e, 102f. Each sidewall 122 defines a plurality of inwardly facing recesses 124 shaped to receive the attachment arrangement 42 of the telecommunications components 40. In one example, the attachment arrangement 42 includes semi-circular shaped tabs with the recesses 124 also having a semi-circular shape. Other shapes are possible. In one aspect, the main body 102 can be molded as a single component, for example an injection molded plastic component, wherein the recesses 124 are formed such that they extend through the bottom side 102b of the main body 102. It is also noted that the pair sidewalls 122 and recesses 124 are symmetrically arranged such that the adapter unit 100 is symmetrical about a longitudinal axis X. With such a configuration, the telecommunications component 40 can be easily mounted to the adapter unit 100 in multiple orientations.

In the example presented, the telecommunications component 40 can be connected to the adapter unit 100 by orienting the telecommunications component 40 such that the tabs 42 of the attachment arrangements 42 are aligned with the attachment arrangement sidewalls 122 with a bottom surface of the telecommunication component 40 parallel and adjacent to the top side 102a. The telecommunications component 40 is then moved in a direction parallel to the sidewalls 122 until the tabs 42 of the attachment arrangements 42 engage or snap into the first pair of recesses 124 of the attachment arrangement 120. The telecommunications component can further displaced until the tabs 42 of the attachment arrangements 42 are engaged with the desired pair of recesses 124 of the attachment arrangement 120. In one aspect, the connection between the attachment arrangements 120, 42 can be characterized as a snap-fit type arrangement. The telecommunications component 40 can be attached to the adapter unit 100 before or after the adapter unit 100 is attached to the tray 12 via the attachment arrangements 30, 110.

In one aspect, the adapter unit main body 102 has a length L and a width W. The length L is configured, with respect to the attachment arrangements 110, such that the adapter units 100 can be mounted onto the tray 12 to abut each other in an adjacent relationship such that the second attachment features 120 are aligned from adapter unit to adapter unit with a minimal or no gap between the sidewalls 122 and between the ends 102e, 102f. By setting the length L in such a manner, an optimal loading density of adapter units 100 onto the tray 12 can be achieved, thereby enabling for the highest number of telecommunications components 40 to be mounted within the tray 12 on the adapter units 100.

Figure 2:
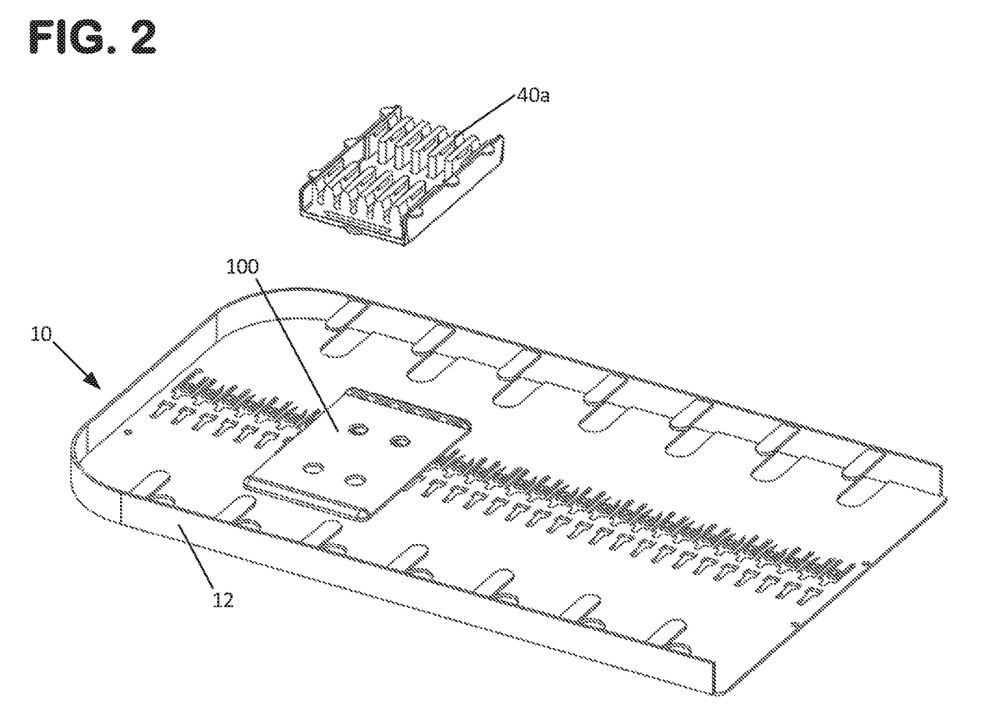
FIG. 2 is a perspective view of the telecommunications tray shown in FIG. 1, with an adapter unit connected to the tray with a first telecommunications component ready for installation onto the adapter unit.
Figure 3:
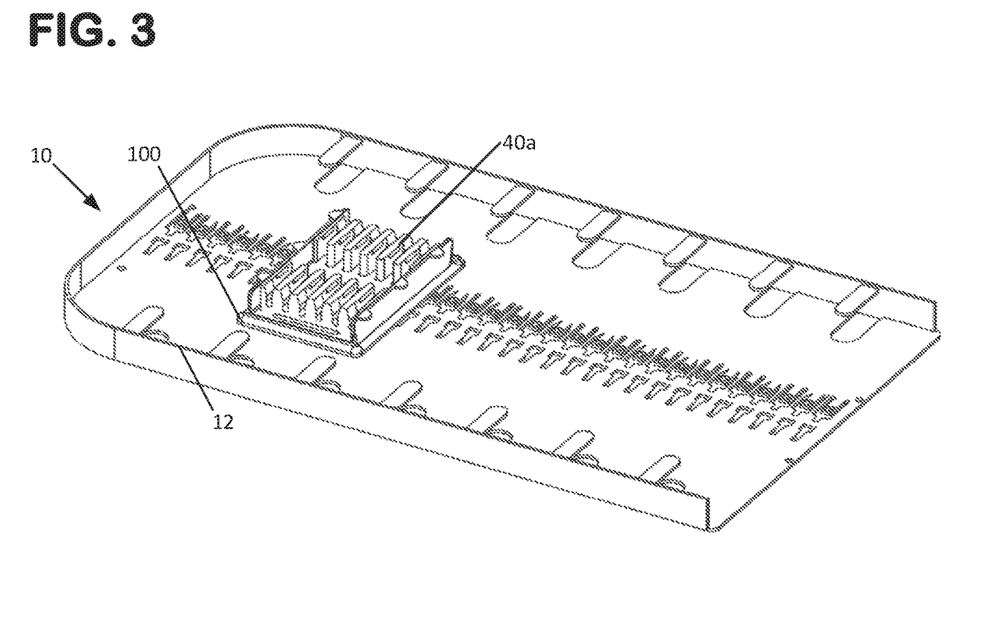
FIG. 3 is a perspective view of the telecommunications tray shown in FIG. 1, with the first telecommunications component connected to the adapter unit.
Figure 4:
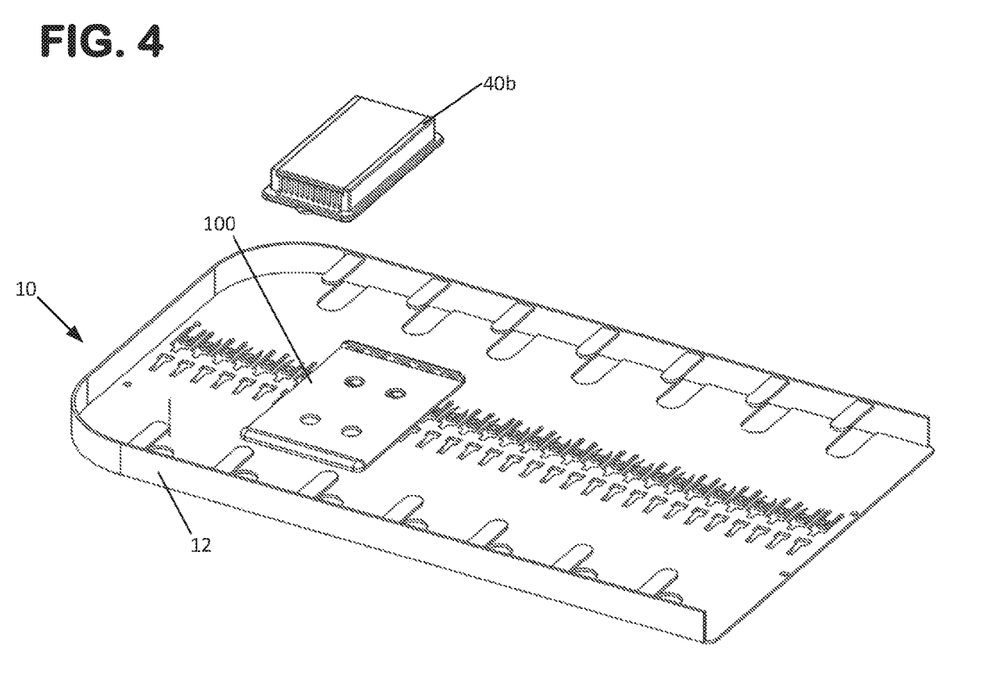
FIG. 4 is a perspective view of the telecommunications tray shown in FIG. 1, with an adapter unit connected to the tray with a second telecommunications component ready for installation onto the adapter unit.
Figure 5:
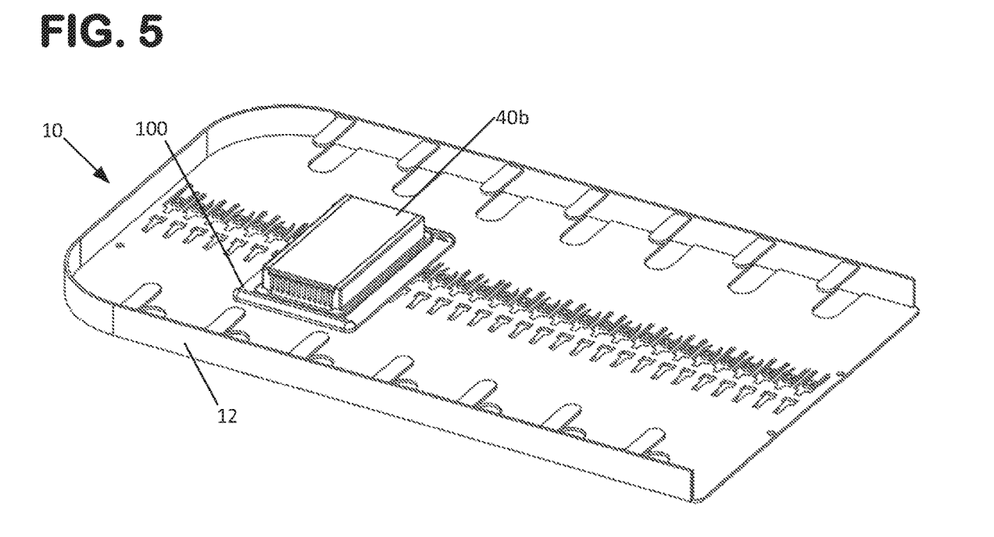
FIG. 5 is a perspective view of the telecommunications tray shown in FIG. 1, with the second telecommunications component connected to the adapter unit.
Figure 6:
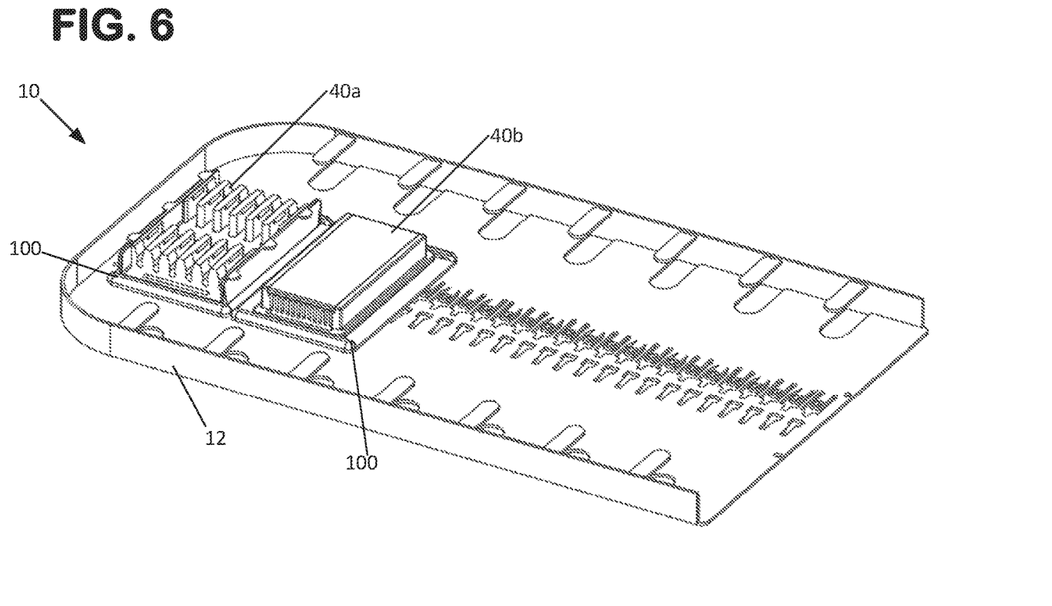
FIG. 6 is a perspective view of the telecommunications tray shown in FIG. 1, with two adapter units connected to the tray, with a first telecommunications component connected to one of the adapter units and a second telecommunications component connected to the other of the adapter units.
Figure 7:
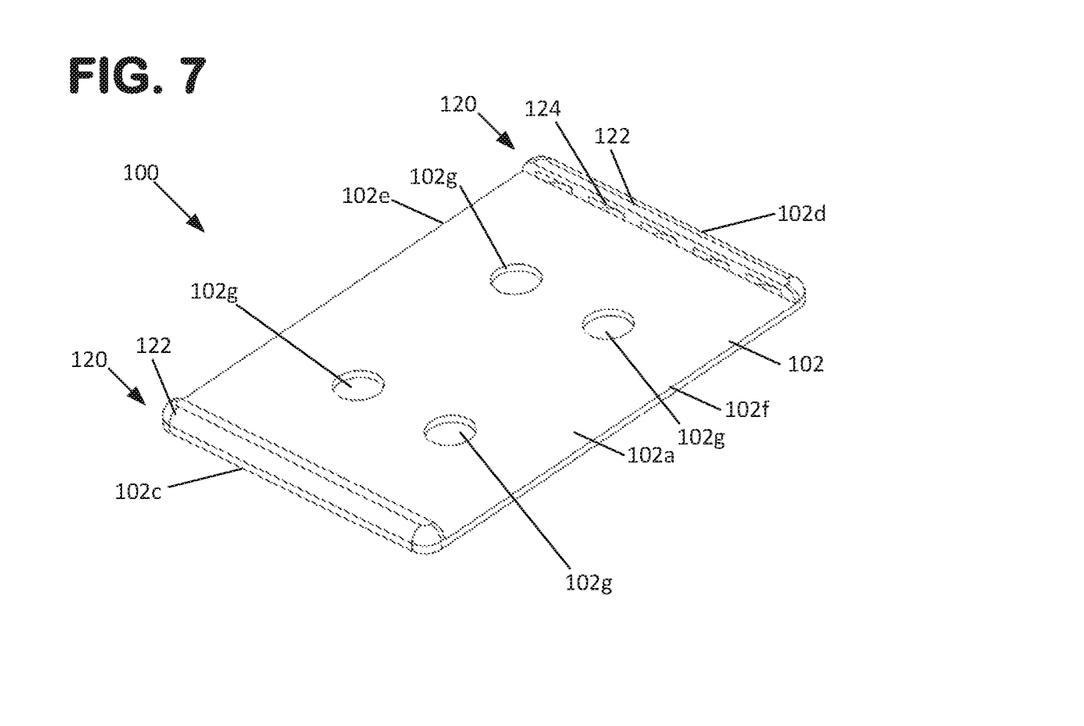
FIG. 7 is a top perspective view of the adapter unit shown in FIG. 1.
Figure 8:
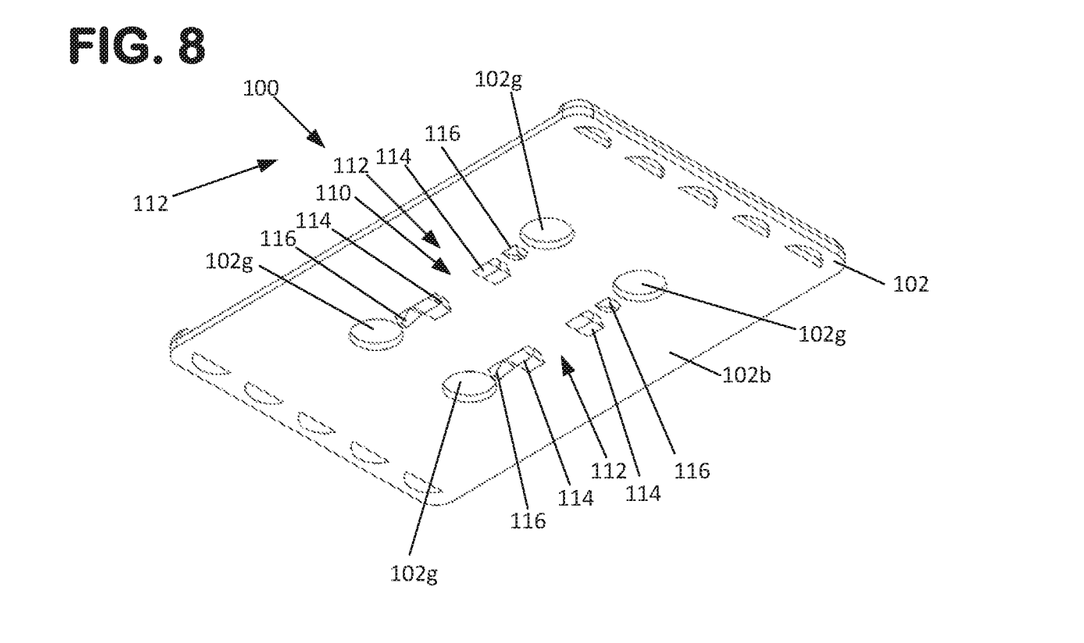
FIG. 8 is a bottom perspective view of the adapter unit shown in FIG. 1.
Figure 9:
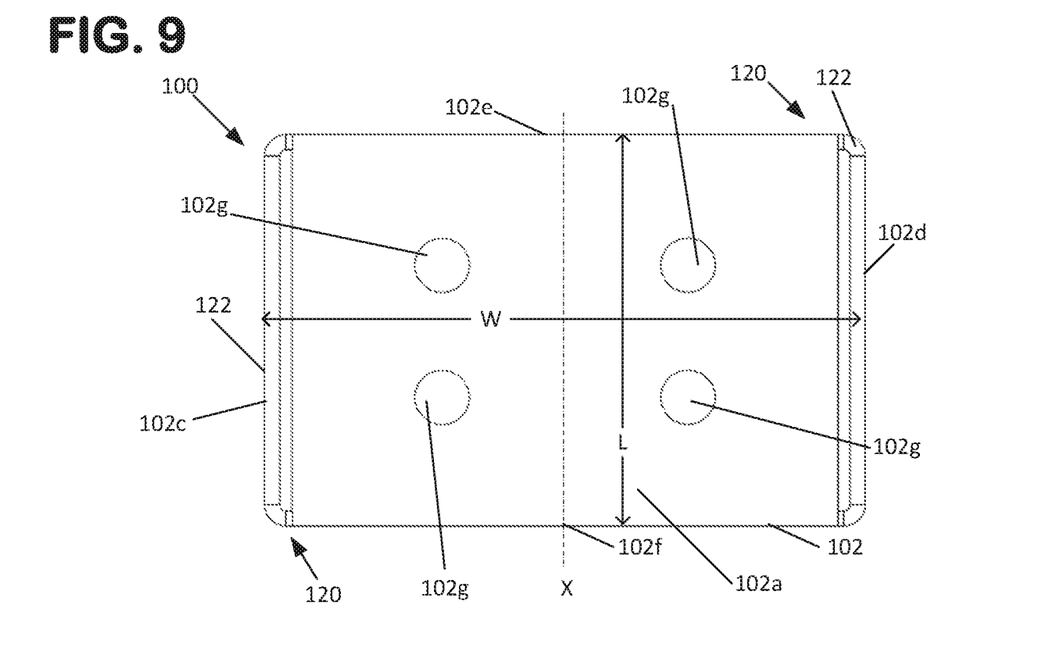
FIG. 9 is a top view of the adapter unit shown in FIG. 1.
Figure 10:
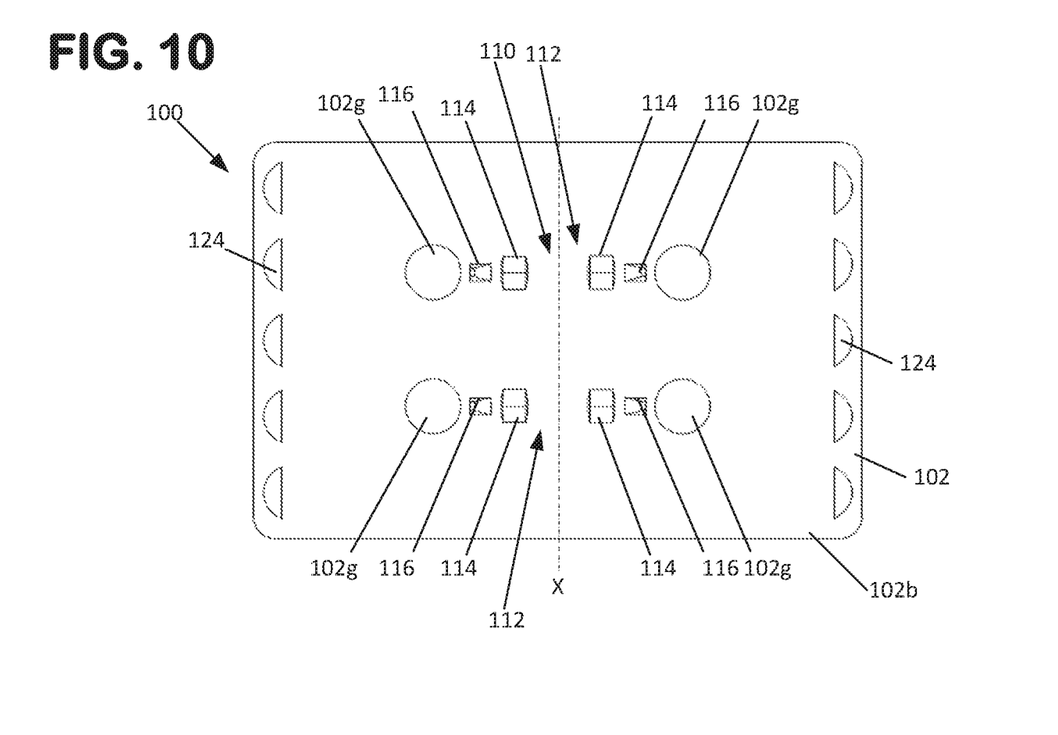
FIG. 10 is a bottom view of the adapter unit shown in FIG. 1.
Figure 11:
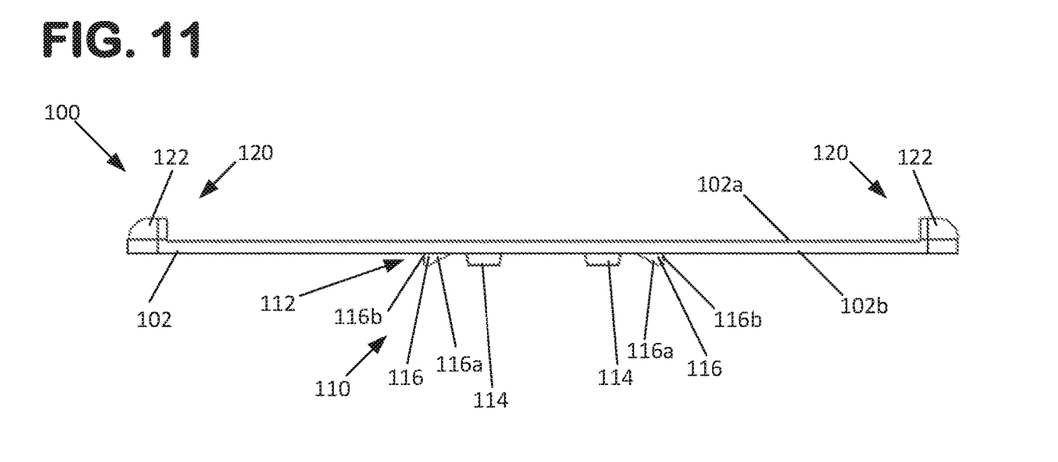
FIG. 11 is a first side view of the adapter unit shown in FIG. 1.
Figure 12:
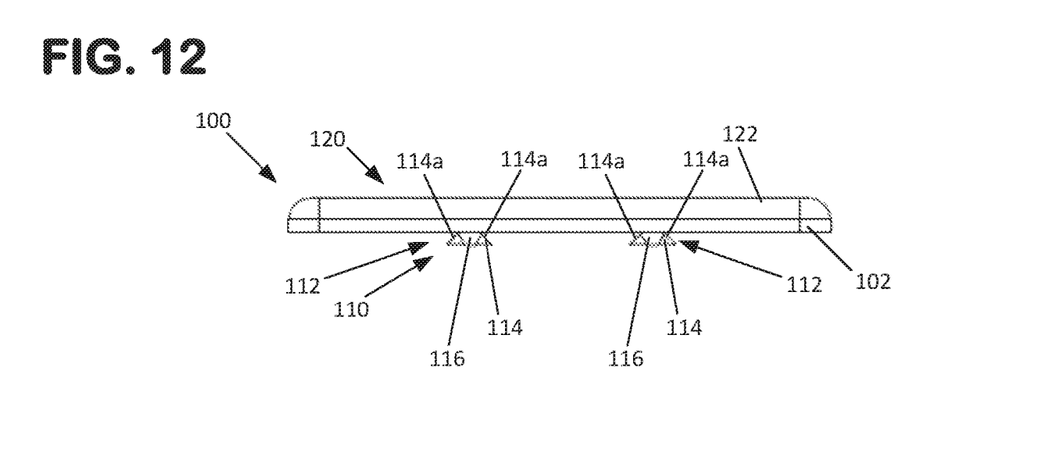
FIG. 12 is a second side view of the adapter unit shown in FIG. 1.

Referring FIGS. 2 to 6, various attachment arrangements are shown. In FIG. 2, the adapter unit 100 is shown as being connected to the tray 12 via the attachment arrangements 30, 110 with a telecommunications component 40a, configured as a splice holder, not yet installed onto the adapter unit 100. In FIG. 3, the telecommunications component 40a has been attached to the adapter unit 100 such that the telecommunications component 40a is secured to the tray 12. In FIG. 4, the adapter unit 100 is shown as being connected to the tray 12 via the attachment arrangements 30, 110 with a telecommunications component 40b, configured as a WDM unit, not yet installed onto the adapter unit 100. In FIG. 5, the telecommunications component 40b has been attached to the adapter unit 100 such that the telecommunications component 40b is secured to the tray 12. In FIG. 6, the telecommunications components 40a and 40b have each been attached to an adapter unit 100 that is connected to the tray 12 such that the telecommunications components 40a, 40b are secured to the tray 12. It is noted that the adapter unit 100 is shown as being sized to accommodate a single telecommunications component 40. However, the adapter unit 100 can be configured such that multiple telecommunications components 40 are supported by the same adapter unit 100. In one example, the adapter unit 100 is sized to extend the majority of the length of the tray 12.

The various examples described above are provided by way of illustration only and should not be construed to limit the scope of the present disclosure. Those skilled in the art will readily recognize various modifications and changes that may be made with respect to the examples and applications illustrated and described herein without departing from the true spirit and scope of the present disclosure.

What is claimed is:

1. A telecommunications assembly comprising:
   a) an adapter unit, the adapter unit being formed with a main body defining a first attachment feature disposed on a bottom side of the main body and a second attachment feature disposed on a top side of the main body, the second attachment feature including at least one pair of oppositely facing recesses disposed in oppositely facing sidewalls extending from the main body top side;
   b) a tray defining a base wall, the tray defining a third attachment feature removably interconnected with the first attachment feature; and
   c) a telecommunications component defining a fourth attachment feature removably interconnected with the second attachment feature such that the telecommunications component is attached to the tray by the adapter unit, the fourth attachment feature being incompatible for attachment with the third attachment feature, wherein the adapter unit main body defines at least one aperture for enabling disconnection of the first and third attachment features.

2. The telecommunications assembly of claim 1, wherein the first attachment feature includes a plurality of first attachment features.

3. The telecommunications assembly of claim 1, wherein the second attachment feature includes a plurality of second attachment features.

4. The telecommunications assembly of claim 1, wherein the adapter unit is formed as a unitary component.

5. The telecommunications assembly of claim 1, wherein the adapter unit is symmetrical about a longitudinal axis.

6. The telecommunications assembly of claim 1, wherein the first attachment feature includes at least one interlock structure and at least one ramped structure.

7. The telecommunications assembly of claim 6, wherein the first attachment feature includes a plurality of interlock structures and a plurality of ramped structures.

8. The telecommunications assembly of claim 1, wherein the second attachment feature includes a plurality of pairs of oppositely facing recesses disposed in the oppositely facing sidewalls.

9. An adapter unit for interconnecting a telecommunications component with a telecommunications tray, the adapter unit comprising:
 a) a main body defining a bottom side and a top side and extending along a longitudinal axis;
 b) a first attachment feature including at least one projection extending from the bottom side and being located a first distance from the longitudinal axis, the first attachment feature being configured for attachment to a corresponding attachment feature of the telecommunications tray; and
 c) a second attachment feature disposed on the top side, the second attachment feature being configured for attachment to a corresponding attachment feature of the telecommunications component, the second attachment feature being incompatible for attachment with the first attachment feature, the second attachment feature including at least one pair of oppositely facing recesses disposed in oppositely facing sidewalls extending from the main body top side, wherein the oppositely facing sidewalls are each located at a second distance from the longitudinal axis that is greater than the first distance.

10. The adapter unit of claim 9, wherein the first attachment feature includes a plurality of first attachment features.

11. The adapter unit of claim 9, wherein the second attachment feature includes a plurality of second attachment features.

12. The adapter unit of claim 9, wherein the adapter unit is formed as a unitary component.

13. The adapter unit of claim 9, wherein the adapter unit is symmetrical about the longitudinal axis.

14. The adapter unit of claim 9, wherein the first attachment feature includes at least one interlock structure and at least one ramped structure.

15. The adapter unit of claim 14, wherein the first attachment feature includes a plurality of interlock structures and a plurality of ramped structures.

16. The adapter unit of claim 9, wherein the second attachment feature includes a plurality of pairs of oppositely facing recesses disposed in the oppositely facing sidewalls.

17. The adapter unit of claim 1, wherein the adapter unit main body defines at least one aperture for enabling disconnection of the first attachment feature and the corresponding attachment feature of the tray.

18. An adapter unit for interconnecting a telecommunications component with a telecommunications tray, the adapter unit comprising:
 a) a main body defining a bottom side and a top side;
 b) a first attachment feature disposed on the bottom side, the first attachment feature being configured for attachment to a corresponding attachment feature of the telecommunications tray; and
 c) a second attachment feature disposed on the top side, the second attachment feature being configured for attachment to a corresponding attachment feature of the telecommunications component, the second attachment feature being incompatible for attachment with the first attachment feature, the second attachment feature including at least one pair of oppositely facing recesses disposed in oppositely facing sidewalls extending from the main body top side, wherein the adapter unit main body defines at least one aperture for enabling disconnection of the first attachment feature and the corresponding attachment feature of the tray.

19. The adapter unit of claim 18, wherein the first attachment feature includes at least one interlock structure and at least one ramped structure.

20. The adapter unit of claim 18, wherein the wherein the adapter unit is formed as a unitary component that is symmetrical about a longitudinal axis and is formed with a plurality of first attachment features and a plurality of second attachment features.

* * * * *

UNITED STATES PATENT AND TRADEMARK OFFICE
CERTIFICATE OF CORRECTION

PATENT NO. : 11,199,674 B2
APPLICATION NO. : 16/887876
DATED : December 14, 2021
INVENTOR(S) : Allen Page 1 of 1

It is certified that error appears in the above-identified patent and that said Letters Patent is hereby corrected as shown below:

In the Claims

Column 8, Line 45, Claim 20: "wherein the wherein the" should read --wherein the--

Signed and Sealed this
Twenty-second Day of February, 2022

Drew Hirshfeld
*Performing the Functions and Duties of the*
*Under Secretary of Commerce for Intellectual Property and*
*Director of the United States Patent and Trademark Office*